(12) United States Patent
Pincheon

(10) Patent No.: US 10,532,690 B2
(45) Date of Patent: Jan. 14, 2020

(54) STRUCTURAL CROSS FRAME CONNECTOR AND SYSTEM

(71) Applicant: Jeffrey R. Pincheon, Sebastian, FL (US)

(72) Inventor: Jeffrey R. Pincheon, Sebastian, FL (US)

( * ) Notice: Subject to any disclaimer, the term of this patent is extended or adjusted under 35 U.S.C. 154(b) by 0 days.

(21) Appl. No.: 15/399,910

(22) Filed: Jan. 6, 2017

(65) Prior Publication Data
US 2018/0194415 A1    Jul. 12, 2018

(51) Int. Cl.
| | |
|---|---|
| *B60P 7/00* | (2006.01) |
| *B60P 3/10* | (2006.01) |
| *B62D 21/12* | (2006.01) |
| *B62D 21/20* | (2006.01) |

(52) U.S. Cl.
CPC .............. *B60P 3/1075* (2013.01); *B60P 3/10* (2013.01); *B60P 3/1033* (2013.01); *B60P 3/1066* (2013.01); *B62D 21/12* (2013.01); *B62D 21/20* (2013.01); *B60P 3/1083* (2013.01)

(58) Field of Classification Search
CPC ...... B62D 63/08; B60P 3/1033; B60P 3/1066; B60P 3/1083; B60P 3/10; B60P 3/1075
USPC .................... 410/48–50, 2–3, 143–144, 150; 296/184.1, 187.08, 193.07; 280/414.1, 280/414.2, 414.3, 790, 143
See application file for complete search history.

(56) References Cited

U.S. PATENT DOCUMENTS

| | | | | |
|---|---|---|---|---|
| 2,030,263 A | * | 2/1936 | Mercer, Jr. ............... | B60G 9/04 267/226 |
| 2,531,947 A | * | 11/1950 | Reading ................ | B60P 3/1091 280/414.3 |
| 4,241,810 A | * | 12/1980 | Newlon ............... | B65D 81/113 410/49 |
| 5,743,689 A | * | 4/1998 | Schlaeger ............... | B60P 3/077 410/30 |
| 2009/0226275 A1 | * | 9/2009 | Park ....................... | B60P 3/035 410/49 |

* cited by examiner

*Primary Examiner* — Stephen T Gordon
(74) *Attorney, Agent, or Firm* — Patent CEO, LLC; Phillip Vales

(57) ABSTRACT

A structural cross frame connector is described having a multipurpose system of attachment. The device has two main forms one with a vertical offset and one without this vertical offset. The central portion has an arch by which weight is distributed accordingly. The connectors have a a group of pass through holes whereby a pass through rod is attached thereto using fasteners. Various structural members can be attached to the pass through rod using pass right and left pass through cavities typically used as structural support members and a central pass through cavity typically used as a hitching station. Leaf springs are also mountable on pass through rods and freely operate on another connector right and left pass through cavity for use as a suspension system.

23 Claims, 15 Drawing Sheets

STRUCTURAL CROSS FRAME CONNECTOR AND SYSTEM

FIELD OF THE INVENTION

The present invention relates to a device utilized to connect various components. More particularly, the present invention relates to a cross frame connector and assembly system utilized to support the weight of a waterborne craft during trailer transportation.

BACKGROUND OF THE INVENTION

Fiberglass

The process of forming items from fiberglass is well understood and has applicability in storage tanks, boating, housing, piping and more. Fiberglass is a reinforced plastic fiber that becomes hardened when combined together with a boding agent forming a final composite material. The other component is a plastic resin, usually polyester, vinylester and sometimes epoxies are increasingly used these days. First, a male or female mold is created for the product being created. Then, final parts are built using the composite material formed from the above molds or intermediate molds created for this use.

Trailers

Typical trailers are unpowered vehicles that are being towed by a powered vehicle such as an automobile or truck. Trailers are used to tow a wide range of property such as motorcycles, bicycles, livestock, boats and more. Trailers come in a variety of shapes, sizes and methods of construction.

However, this discussion is directed to those types of trailers that come in the form of a structural assembly made from various frame members either welded and or bolted together. In order to provide appropriate suspension for the trailer system, hangers are welded on tho the assembled frame for attachment of leaf springs. These springs prevent excessive shock and vibration during transport.

Further customizing the trailer to the needs of the implementation, bunks can be bolted or welded on the assembly for locating a jet ski or boat support. Alternatively, instead of the bunks, a utility trailer is created by attaching a deck to the top of the frame.

With all of these design choices, however, one of the problems with current industry standards is that the trailer once completed is a device designed for a discrete use. In other words, the trailer has one function, porting a jet ski, boat, canoe, kayak or utility trailer. Because of this a user has to spend a considerable sum of money to have a device that is used only for one type of service. This leaves no option for easily transferring items from one type of trailer system to another as the boat type of trailer does not lend itself to taking a motorcycle or vice versa. Thus, there needs to be some way for a user to transport a variety of items such as a boat, canoe, jetski etcetera.

Another problem with trailers today is that steel or galvanized steel materials utilized in their construction easily corrode when exposed to the elements during ordinary use. The immersion of boat trailers into salt or fresh water during boat launchings causes electrolytic actions that along with the effect of salt and other corrosive elements grievously affect these materials. Thus, the life cycle of a modern trailer is greatly limited by the materials found in their construction to the point that they might last only 3-4 years of typical use.

One solution to the above corrosion problems has been to use aluminum in place of the steel materials. However, after several years the general appearance of the trailers are not necessarily commensurate with their promised performance. This because this aluminum frame has decay along where the frame members are bolted together or where U-bolts are used over frame members for trailer bunks.

Thus, there needs to be some solution that provide materials that are not only corrosion resistant but that are cost effective and strong as well.

Torsion Axle, U-bolts & Tire

A torsion axle has a main rod or bar and independent spindles on either side for mounting of a tire thereon; adjustable spindles, mounts, brackets and more are some of the common feature of these devices that are too numerous to mention in this limited space. Also, there are various types of attachments systems including U bolts and the like as well as others beyond the scope of this discussion.

Accordingly, there needs to be some solutions to overcome the aforementioned problems.

SUMMARY OF THE INVENTION

The present invention overcomes the deficiencies of the known art and the problems that remain unsolved by providing a towable system as follows.

A towable connector system comprising:
an integral body formed as a single unit; the integral connector body having:
  a front surface having a first top edge, a second top edge, a first bottom edge, a first lateral edge and a second lateral edge;
  a back surface having a third top edge, a fourth top edge, a second bottom edge, a third lateral edge and a fourth lateral edge;
  a bottom portion sharing the first bottom edge with the front surface and sharing the second bottom edge with the back surface as well as having a first side edge and a second side edge;
  a first side having a fifth top edge, wherein the first side shares the first side edge with the bottom portion as well as sharing the first lateral edge with the front surface and sharing the third lateral edge with the back surface;
  a second side having a sixth top edge, wherein the second side shares the second side edge with the bottom portion as well as sharing the second lateral edge with the front surface and sharing the fourth lateral edge with the back surface; such that the front surface and the back surface are integrally formed together through the bottom portion and the first side and the second side at opposite ends of the connector body;
  a first top surface bordered by the first top edge, the third top edge and the fifth top edge; and
  a second top surface bordered by the second top edge, the fourth top edge and the sixth top edge; such that the first top surface and the second top surface are formed in a same plane and integrally formed together through
    an intermediate portion wherein the intermediate portion is vertically offset from both the first top surface and the second top surface;
  a first pass through cavity nearby the first top surface such that the first pass through cavity perforates the front and back surfaces;

a second pass through cavity nearby the second top surface such that the second pass through cavity perforates the front and back surfaces;
a right portion integrally formed from the first top surface and integrally formed with a right horizontal rectangular portion;
a left portion integrally formed from the second top surface and integrally formed with a left horizontal rectangular portion;
a right step integrally formed with the right portion; and
a left step integrally formed with the left portion; such that the intermediate portion is integrally formed therewith and disposed between the right and the left step.

In another aspect, further comprising:
a middle pass through cavity underneath the intermediate portion such that the middle pass through cavity perforates the front and back surfaces.

In another aspect, wherein the intermediate portion further comprises:
an arch intermediate portion such that the arch intermediate portion is a concavity disposed such that
a central portion thereof is deeper than any other location in the arch intermediate portion and thereby closer to the bottom portion.

In another aspect, wherein the integral connector body is formed of fibrous material.

A towable connector system comprising:
an integral connector body formed as a single unit; the integral connector body having:
a front surface having a first top edge, a second top edge, a first bottom edge, a first lateral edge and a second lateral edge;
a back surface having a third top edge, a fourth top edge, a second bottom edge, a third lateral edge and a fourth lateral edge;
a bottom portion sharing the first bottom edge with the front surface and sharing the second bottom edge with the back portion as well as having a first side edge and a second side edge;
a first side having a fifth top edge, wherein the first side shares the first side edge with the bottom portion as well as sharing the first lateral edge with the front surface and sharing the third lateral edge with the back surface;
a second side having a sixth top edge, wherein the second side shares the second side edge with the bottom portion as well as sharing the second lateral edge with the front surface and sharing the fourth lateral edge with the back surface; such that the front surface and the back surface are integrally formed together through the first side and the second side at opposite ends of the connector body; and the front surface and the back surface are also integrally formed together through the bottom portion, the first side, and the second side;
a first top surface bordered by the first top edge, the third top edge and the fifth top edge; and
a second top surface bordered by the second top edge, the fourth top edge and the sixth top edge; such that the first top surface and the second top surface are formed in a same plane and integrally formed together through
an intermediate portion wherein the intermediate portion is vertically offset from both the first top surface and the second top surface;

a first pass through cavity nearby the first top surface such that the first pass through cavity perforates the front and back surfaces;
a second pass through cavity nearby the second top surface such that the second pass through cavity perforates the front and back surfaces;
wherein the towable connector system further comprises:
a first top portion integrally formed from the first top surface through a first transition surface there between;
a second top portion integrally formed from the second top surface through a second transition surface there between; and wherein the intermediate portion further comprises:
an arch disposed between the first top portion and the second top portion.

In another aspect, wherein the integral connector body is formed of fibrous material.

In another aspect, wherein the arch disposed between the first top portion and the second top portion further comprises:
a step down arch integrally formed from the first top portion at a third transition surface there between, and wherein the step down arch is integrally formed from the second top portion at a fourth transition surface there between;
wherein the step down arch is disposed closer to the bottom portion than the first or second top portions.

A towable connector system comprising:
an integral connector body formed as a single unit; the integral connector body having:
a front surface having a first top edge, a second top edge, a first bottom edge, a first lateral edge and a second lateral edge;
a back surface having a third top edge, a fourth top edge, a second bottom edge, a third lateral edge and a fourth lateral edge;
a bottom portion sharing the first bottom edge with the front surface and sharing the second bottom edge with the back portion as well as having a first side edge and a second side edge;
a first side having a fifth top edge, wherein the first side shares the first side edge with the bottom portion as well as sharing the first lateral edge with the front surface and sharing the third lateral edge with the back surface;
a second side having a sixth top edge, wherein the second side shares the second side edge with the bottom portion as well as sharing the second lateral edge with the front surface and sharing the fourth lateral edge with the back surface; such that the front surface and the back surface are integrally formed together through the first side and the second side at opposite ends of the connector body; and the front surface and the back surface are also integrally formed together through the bottom portion, the first side, and the second side;
a first top surface bordered by the first top edge, the third top edge and the fifth top edge; and
a second top surface bordered by the second top edge, the fourth top edge and the sixth top edge; such that the first top surface and the second top surface are formed in a same plane and integrally formed together through
an intermediate portion wherein the intermediate portion is vertically offset from both the first top surface and the second top surface;

a first pass through cavity nearby the first top surface such that the first pass through cavity perforates the front and back surfaces;

a second pass through cavity nearby the second top surface such that the second pass through cavity perforates the front and back surfaces;

a first top portion parallel to and integrally formed with the first top surface; wherein the first top portion is also integrally formed with the intermediate portion and vertically offset from both the first top surface and the intermediate portion such that the first top portion is closer to the bottom portion than the first top surface is.

In another aspect, further comprising:

a second top portion parallel to and integrally formed with the second top surface; wherein the second top portion is also integrally formed with the intermediate portion and vertically offset from both the second top surface and the intermediate portion such that the second top portion is closer to the bottom portion than the second top surface is.

In another aspect, wherein the intermediate portion further comprises:

an arch intermediate portion wherein the top surface and the top portion are integrally formed together through an integrally formed transition surface such that the arch intermediate portion is integrally formed from the top portion therewith.

In another aspect, wherein the arch intermediate portion further comprises:

a concavity disposed such that
a central portion thereof is deeper than any other location of the arch intermediate portion and thereby closer to the bottom portion than the first top surface or the first top portion are.

In another aspect, further comprising:

a first step down offset portion such that the first step down offset portion is integral with the first top portion and the intermediate portion wherein the intermediate portion is situated closer to the bottom portion than the first top portion or the first top surface are.

In another aspect, further comprising:

a second step down offset portion such that the second offset portion is integral with the second top portion and the intermediate portion wherein the intermediate portion is situated closer to the bottom portion than a second top portion or the second top surface are; wherein the second top portion is parallel to and integrally formed with the second top surface; wherein the second top portion is also integrally formed with the intermediate portion and vertically offset from both the second top surface and the intermediate portion.

In another aspect, wherein the integral connector body is formed of fibrous material.

A towable connector system comprising:
an integral connector body formed as a single unit; the integral connector body having:
  a front surface having a first top edge, a second top edge, a first bottom edge, a first lateral edge and a second lateral edge;
  a back surface having a third top edge, a fourth top edge, a second bottom edge, a third lateral edge and a fourth lateral edge;
  a bottom portion sharing the first bottom edge with the front surface and sharing the second bottom edge with the back surface as well as having a first side edge and a second side edge;
  a first side having a fifth top edge, wherein the first side shares the first side edge with the bottom portion as well as sharing the first lateral edge with the front surface and sharing the third lateral edge with the back surface;
  a second side having a sixth top edge, wherein the second side shares the second side edge with the bottom portion as well as sharing the second lateral edge with the front surface and sharing the fourth lateral edge with the back surface; such that the front surface and the back surface are integrally formed together through the bottom portion and the first side and the second side at opposite ends of the connector body;
  a first top surface bordered by the first top edge, the third top edge and the fifth top edge; and
  a second top surface bordered by the second top edge, the fourth top edge and the sixth top edge; such that
  the first top surface and the second top surface are formed in a same plane and integrally formed together through
    an intermediate portion wherein the intermediate portion is vertically offset from both the first top surface and the second top surface;
  a first pass through cavity nearby the first top surface such that the first pass through cavity perforates the front and back surfaces;
  a second pass through cavity nearby the second top surface such that the second pass through cavity perforates the front and back surfaces;
  a middle pass through cavity underneath the intermediate portion such that the middle pass through cavity perforates the front and back surfaces
  a hitching device attached to the middle pass through cavity using fasteners.

In another aspect, wherein the integral connector body is formed of fibrous material.

A unitary connector body comprising:
a front surface;
a back surface;
a bottom surface;
a first side;
a second side;
a first top surface;
a second top surface; such that
the first top surface is integrally formed with the first side, and the second top surface is integrally formed with the second side, and wherein the first top surface and the second top surface are each integrally formed with the front and back surfaces and the first top surface and the second top surface are integrally formed together through:
  an intermediate portion wherein the intermediate portion is vertically offset from both the first top surface and the second top surface;
a first pass through cavity nearby the first top surface such that the first pass through cavity perforates the front and back surface;
a second pass through cavity nearby the second top surface such that the second pass through cavity perforates the front and back surface;
a middle pass through cavity nearby the intermediate portion such that the middle pass through cavity perforates the front and back surface; and
wherein the front surface and the back surfaces are integrally formed together through the first side integrating the front, back and bottom surfaces and the second side integrating the front, back and bottom surfaces at opposite ends of the connector body; and wherein the front surface and the back surfaces are also integrally formed together through the bottom surface such that the unitary connector body further comprises:
a first top portion integrally formed from the first top surface at a first transition surface there between;
a second top portion integrally formed from the second top surface at a second transition surface there between; and wherein the intermediate portion further comprises:
an arch disposed between the first top portion and the second top portion; and such that the arch further comprises:
a step down arch integrally formed from the first top portion at a step down third transition surface there between; and wherein the step down arch is integrally formed from the second top portion at a step down fourth transition surface there between;
wherein the step down arch is disposed closer to the bottom portion than the first or second top portions.

In another aspect, wherein the unitary connector body is formed of fibrous material.

A towable connector system comprising:
an integral connector body formed as a single unit; the integral connector body having:
  a front surface having a first top edge, a second top edge, a first bottom edge, a first lateral edge and a second lateral edge;
  a back surface having a third top edge, a fourth top edge, a second bottom edge, a third lateral edge and a fourth lateral edge;
  a bottom portion sharing the first bottom edge with the front surface and sharing the second bottom edge with the back portion as well as having a first side edge and a second side edge;
  a first side having a fifth top edge, wherein the first side shares the first side edge with the bottom portion as well as sharing the first lateral edge with the front surface and sharing the third lateral edge with the back surface;
  a second side having a sixth top edge, wherein the second side shares the second side edge with the bottom portion as well as sharing the second lateral edge with the front surface and sharing the fourth lateral edge with the back surface; such that the front surface and the back surface are integrally formed together through the first side and the second side at opposite ends of the connector body; and the front surface and the back surface are also integrally formed together through the bottom portion, the first side, and the second side;
  a first top surface bordered by the first top edge, the third top edge and the fifth top edge; and
  a second top surface bordered by the second top edge, the fourth top edge and the sixth top edge; such that the first top surface and the second top surface are formed in a same plane and integrally formed together through
    an intermediate portion wherein the intermediate portion is vertically offset from both the first top surface and the second top surface;
  a first pass through cavity nearby the first top surface such that the first pass through cavity perforates the front and back surfaces;
  a second pass through cavity nearby the second top surface such that the second pass through cavity perforates the front and back surfaces;
  a first pass through hole in the first side such that the first pass through hole exits within the first pass through cavity.

In another aspect, further comprising:
a second pass through hole in the second side such that the second pass through hole exits within the second pass through cavity.

In another aspect, further comprising:
a third pass through hole perforating a first side wall of the first pass through cavity and perforating a second side wall of a middle pass through cavity; wherein the middle pass through cavity is disposed underneath the intermediate portion such that the middle pass through cavity perforates the front and back surfaces.

In another aspect, further comprising:
a fourth pass through hole perforating a third side wall of the middle pass through cavity and perforating a fourth side wall of the second pass through cavity; such that a pass through rod inserted within the first, second, third and fourth holes is attached to the connector body externally thereto in association with the first side and second side.

In another aspect, wherein the integral connector body is formed of fibrous material.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in each figure.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
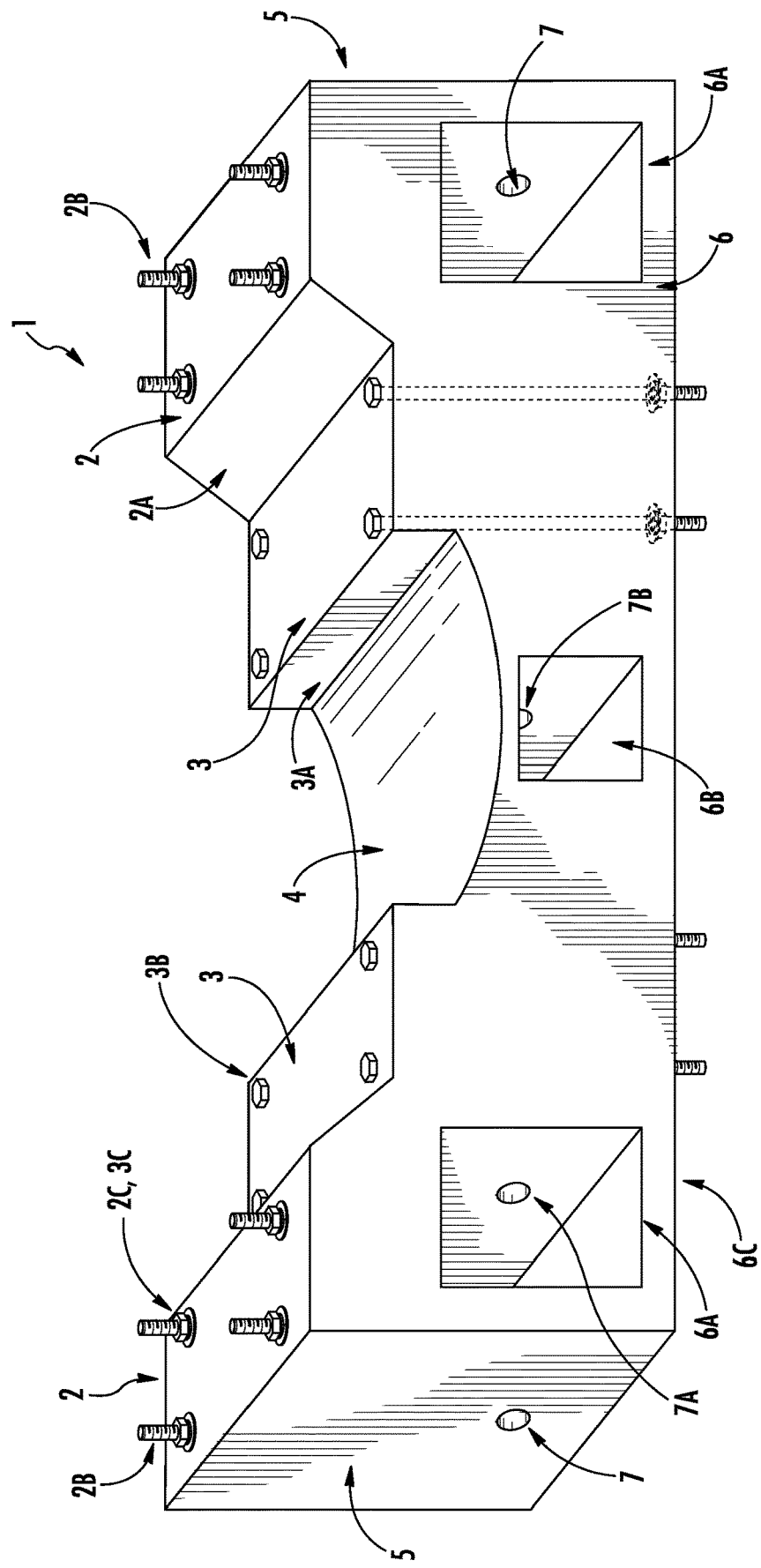
FIG. 1A presents a front isometric view of Structural Cross Frame Connector in an embodiment taught herein.
Figure 1B:
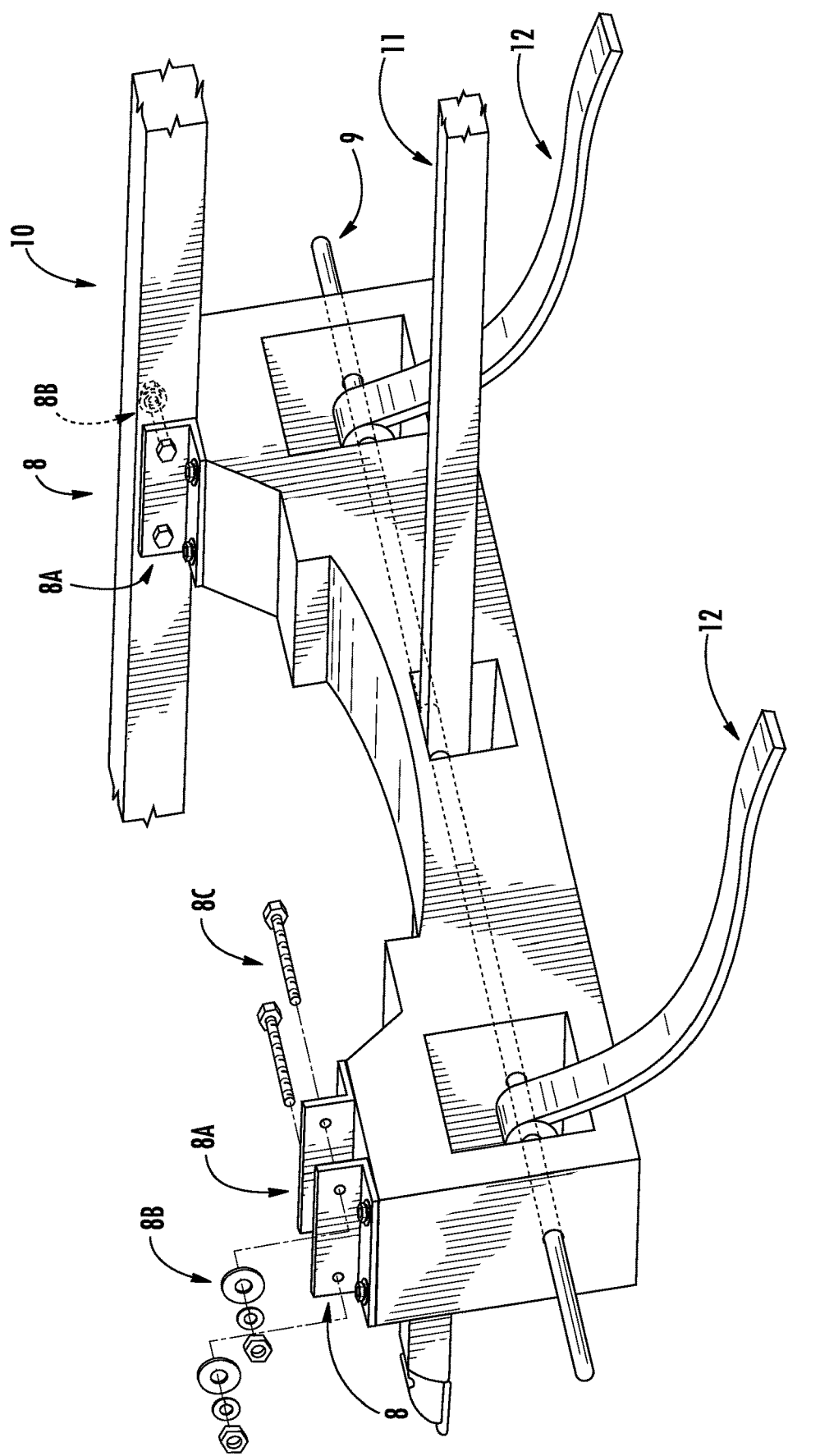
FIG. 1B presents a front isometric view of Structural Cross Frame Connector in one form being used in an embodiment taught herein.
Figure 2:
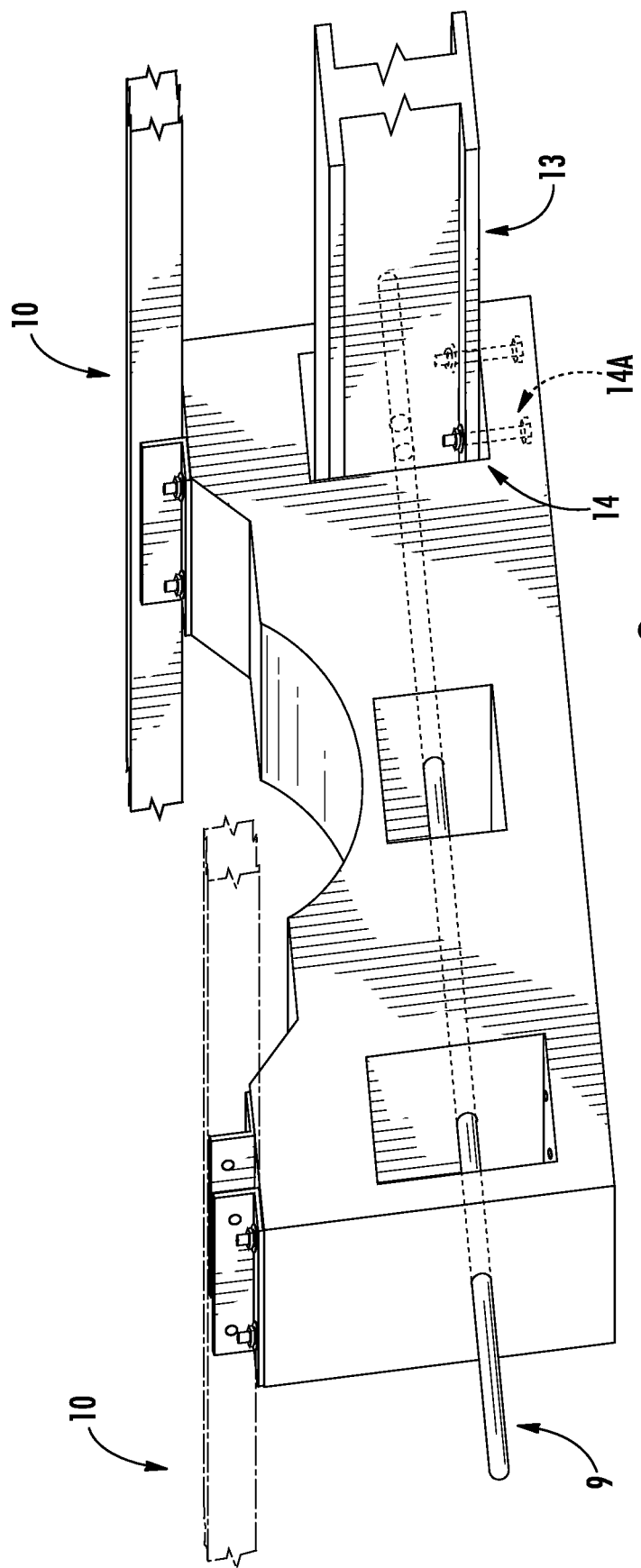
FIG. 2 presents a front isometric view of Structural Cross Frame Connector in a boat/jet-ski configuration used in an embodiment taught herein.

It should be made apparent by a close inspection of the drawings that there are two main types of Structural Cross Frame Connectors taught herein. Namely, one that has vertical rectangular portions 3A as shown in FIG. 1A-1B for example, and one that does not have this stepped down central portion as shown in FIG. 2, 4 for example. The difference being that the right and left rectangular portions 3A are not found in the ones that do not have the step down central portion. Of course, it should be understood that the curved arch still exists in both main types.

FIG. 1A presents a front isometric view of Structural Cross Frame Connector in an embodiment taught herein. The structural cross frame connector 1, hereinafter connector 1, is an integral device made using molded fiberglass construction providing weight, strength and corrosion resistance that would be unavailable otherwise; use of inner foam and non-foam core for strengths as well as various strength core products depending on the strength and application size of trailer. The connector 1 has two identical 'mirror' wings integrally formed from a built up slab of fiberglass material; thus, it should be understood that proceeding from the left side or right side yields a mirror image as you pass the central portion thereof.

A first right side top surface 2 is a square or rectangular shaped portion having four studs placed within holes equidistantly from the edges thereof; these holes proceed down through the connector body perforating it until they reach the top of pass through cavity 6A; nuts are used with washers to attach the studs; it should be appreciated that corresponding holes for those above in top surface 2 are also cut from the bottom portion 6C into cavity 6A. The right edge of the first right side top surface 2 integrally meets the square or rectangular right vertical side 5 of the connector 1 along a first edge thereof. This right vertical side 5 has a bottom edge that meets the rectangular bottom portion 6C of connector 1. The rectangular bottom portion 6C similarly integrally forms into the left vertical side 5 and so on.

A slightly curved or linearly slanted right portion 2A (interchangeably right portion 2A) is integrated to right side top surface 2 along an edge opposite the edge connecting right side top surface 2 to right vertical side 5 such that it integrally proceeds downwards from the first right side top surface 2 towards the left of connector 1. Integrally formed along right portion 2A at an inner left edge thereof is a right horizontal rectangular portion 3. Four holes are formed equidistantly in right horizontal rectangular portion 3 from the edges thereof for insertion of studs 3B to bolt to the bottom or top thereof for a variety of configurations herein described; these holes proceed down through the entire connector body perforating it through the rectangular bottom portion 6C.

Integrally formed along right horizontal rectangular portion 3 at an inner left edge thereof is a right vertical rectangular portion 3A that also has a bottom edge. This bottom edge of right vertical rectangular portion 3A is integrally attached to an edge of a concave arch 4; further, this arch 4 has its curvature downwardly directed so that it obtains a radius from some imaginary center located above the connector 1 in the drawing and the arch is directed deeper inwards to the connector 1.

From this point a mirror image of the device is formed thus, one has a left vertical rectangular portion 3A integrally connected to a left horizontal rectangular portion 3 that in turn integrally forms with a slightly curved or linearly slanted left portion 2A. This in turn forms into a left side top surface 2 that is a square or rectangular shaped portion also integrally formed with a left vertical side 5 that has an edge meeting a rectangular bottom portion 6C. It should be understood that front and back surfaces 6 are integrally formed with the rest of the surfaces 2, 2A, 3, 3A, 4, 5 herein described to meet along front and back edges thereof forming a completed connector 1.

Of course, the left side top surface has four studs 2B within holes that are situated equidistantly from the edges thereof; these holes proceed down through the connector body perforating it until they reach the top of pass through cavity 6A; nuts are used with washers to attach the studs; it should be appreciated that corresponding holes for those above in top surface 2 are also cut from the bottom portion 6C into cavity 6A. Similarly, the left horizontal rectangular portion 3 has four holes that are formed equidistantly from the edges thereof for insertion of studs 3B to bolt to the top or bottom thereof for a variety of configurations herein described. These holes of left horizontal rectangular portion 3 proceed down through the entire connector body perforating it through the rectangular bottom portion 6C.

A first and second pass through cavities (typically circular, rectangular or square) 6A are formed in the body of the right and left wings of the connector 1 approximately under the rectangular right and left side top surfaces 2 and optionally a portion of these cavities 6A are formed under the right and left portions 2A. A middle pass through cavity 6B (typically circular, rectangular or square) is centrally formed under the concave arch 4.

Two separate perforations 7 cut through the structure of the right and left side vertical sides 5 into the first and second pass through cavities 6A. Similarly, two separate perforations 7A cut through the wall of the first and second pass through cavities 6A closest to the center of connector 1. These perforations 7A open into the middle pass through cavity 6B at 7B.

FIG. 1B presents a front isometric view of Structural Cross Frame Connector in one form being used in an embodiment taught herein. This view how a boat support bunk 10 is attached to the connector 1 using two sets of L connectors 8, 8A (outer, inner); these connectors are metal parts having four holes therein two for vertical connection and two for horizontal connection. The two sets of L connectors 8 are each connected to two outer studs 2B one on the right top side 2 and one on the left top side 2 through the vertical holes therein; the two sets of L connectors 8A are each connected to two inner studs 2B one on the right top side 2 and one on the left top side 2 through the vertical holes therein. The boat support bunk 10 sits between the two L connectors 8, 8A and is attached thereto using studs 8C and washers and nuts 8D.

Further, this view shows a two leaf springs 12 are attached to the connector 1 using a pass through rod 9. The pass through rod 9 is inserted within perforation 7 on the right side of connector 1 entering right pass through side cavity 6A and mounting right leaf spring 12 on the rod 9 through a hole in the leaf spring. After this the rod 9 enters perforation 7A in the left inner wall of right pass through cavity 6A; then the rod 9 enters middle pass through cavity 6B (though hole 7B) and engages hitch 11 using a hole therein; next it exits cavity 6B through a similar perforation 7B on its opposite left side wall and proceeds therethrough. The rod 9 is inserted into this second perforation 7B and enters into the left pass through cavity 6A and through hole 7A and mounts a left leaf spring 12 thereon through a hole in the leaf spring. The rod proceeds through the left pass through cavity 6A into a perforation 7 on the left side wall of the left pass through cavity 6A and exits on the left side of connector 1. Both the inside step down (3) and outside step (2) can hold a boat bunk or the cross frame connector 1 can use four boat bunks at once if desired.

FIG. 2 presents a front isometric view of Structural Cross Frame Connector in a boat/jet-ski configuration used in an embodiment taught herein. An aluminum I beam 13 is inserted into both pass through cavities 6A to form a boat/jet ski configuration; however, the figure only shows it entering one of the cavities for the sake of simplicity. The I beam 13 itself has two horizontal portions connected with an intermediate vertical portion integrally formed there between. The I beam 13 has a hole in its intermediate vertical portion for attachment of the pass through rod 9. Additionally, two holes 14 cut through the rectangular bottom portion 6C and through each of the bottom walls of the right and left pass through cavities 6A. These two holes 14 are for the insertion of restraining bolts 14A therein and into corresponding holes on the bottom horizontal portion of I beam 13 connecting the I beam 13 with washers and nut or similar fasteners.

Figure 3:
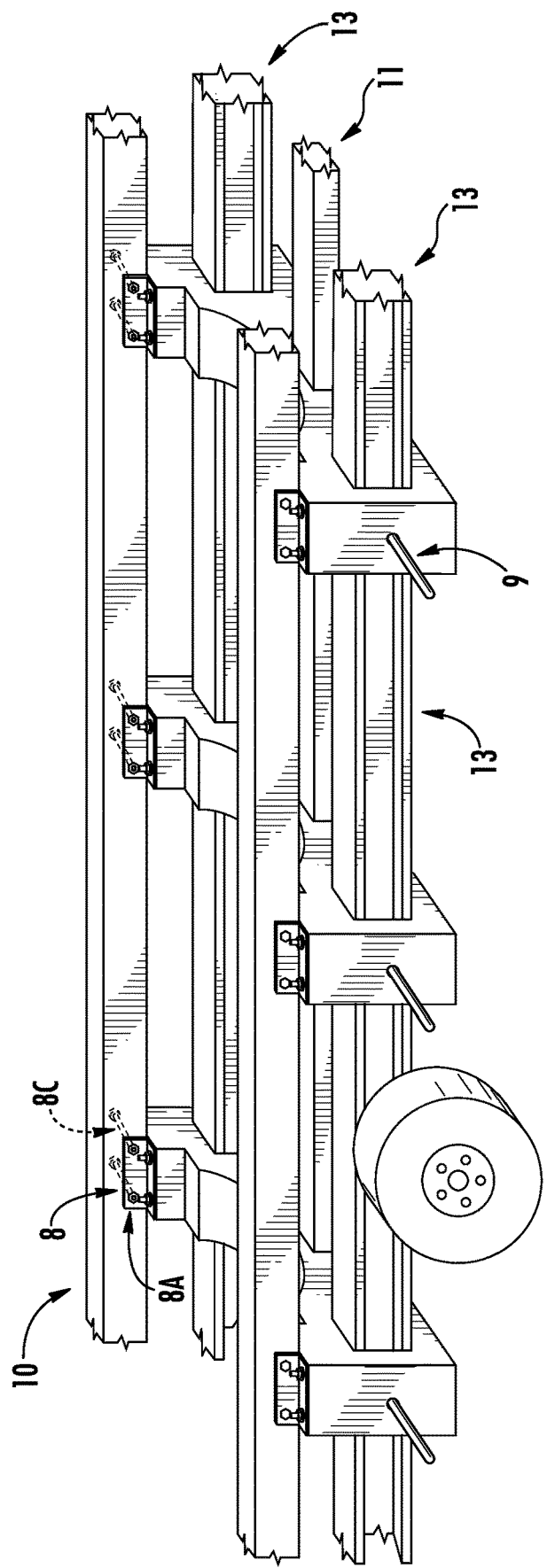
FIG. 3 presents a front isometric view of Structural Cross Frame Connector in a trailer configuration used in an embodiment taught herein.

FIG. 3 presents a front isometric view of Structural Cross Frame Connector in a trailer configuration used in an embodiment taught herein. In this view three connectors 1 are arranged with their longitudinal sides parallel to each other. A boat support bunk 10 is shown prior to assembly with studs 8C used to connect with double washer and nut 8D attachments through lateral holes in the boat support bunk 10. Two I beam or aluminum channel frame members 13, square tube are inserted one each in the right and left pass through cavities 6A of the connectors 1. Similarly, a tow bar hitch 11 is placed within the central pass through cavity 6B of connectors 1. Pass through rods 9 are inserted within the holes 7, 7A, 7B within the connectors and also is threaded through appropriate holes in both the I beam or aluminum channel frame members 13 and the tow bar hitch 11. Appropriate attachment of the rods 9 with nuts, bolts and washers is made to the cross frame connectors 1 externally thereto.

Figure 4:
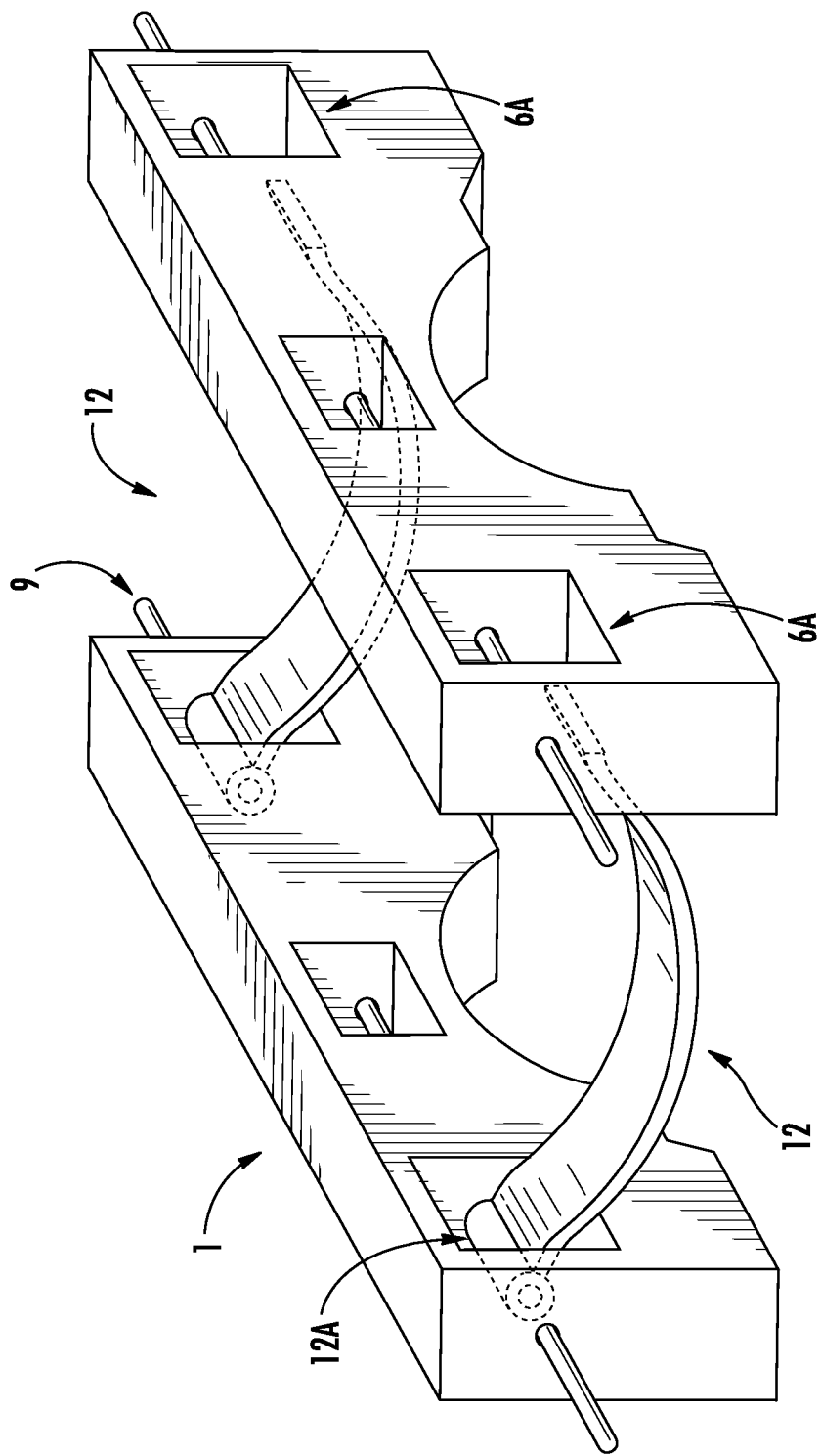
FIG. 4 presents a front isometric view of Structural Cross Frame Connector in a bunk or frame support/leaf spring used in a configuration of an embodiment taught herein.

FIG. 4 presents a front isometric view of Structural Cross Frame Connector in a bunk or frame support/leaf spring used in a utility trailer configuration of an embodiment taught herein. The arch at the central portion of the connector 1 is disposed at the bottom of the implementation. Thus, this embodiment teaches two or more inverted connectors 1 longitudinally parallel to each other; the upside down configuration provides excellent weight distribution since the arch at the central point of the device distributes weight efficiently. Appropriate attachment of the rods 9 with nuts, bolts and washers is made to the cross frame connectors 1 externally thereto.

Leaf springs 12 are inserted one each in pass through cavities 6A on either side of inverted connectors 1. Because the leaf springs 12 are formed from fiberglass materials they provide robust strength and excellent weight savings for the implementation. Both leaf springs 12 have a hole 12A perforating one end thereof; proceeding forwards the springs 12 curve downwards and then upwards in a shallow S configuration. When placed in the connector they are held in place by a pass through rod that threads through the holes 7, 7A, & 7B in connectors 1 pass through cavities 6A and middle pass through cavity 6B and through the holes 12A in each spring 12 disposed within the cavities 6A of the left connector 1. The leaf spring 12 has a hole 12A at one end and another end opposite this hole that is free to move within pass through cavities 6A in the right connector 1 as it sits atop a horizontal surface therein; of course, this motion is only enough to facilitate the springing activity.

Figure 5:
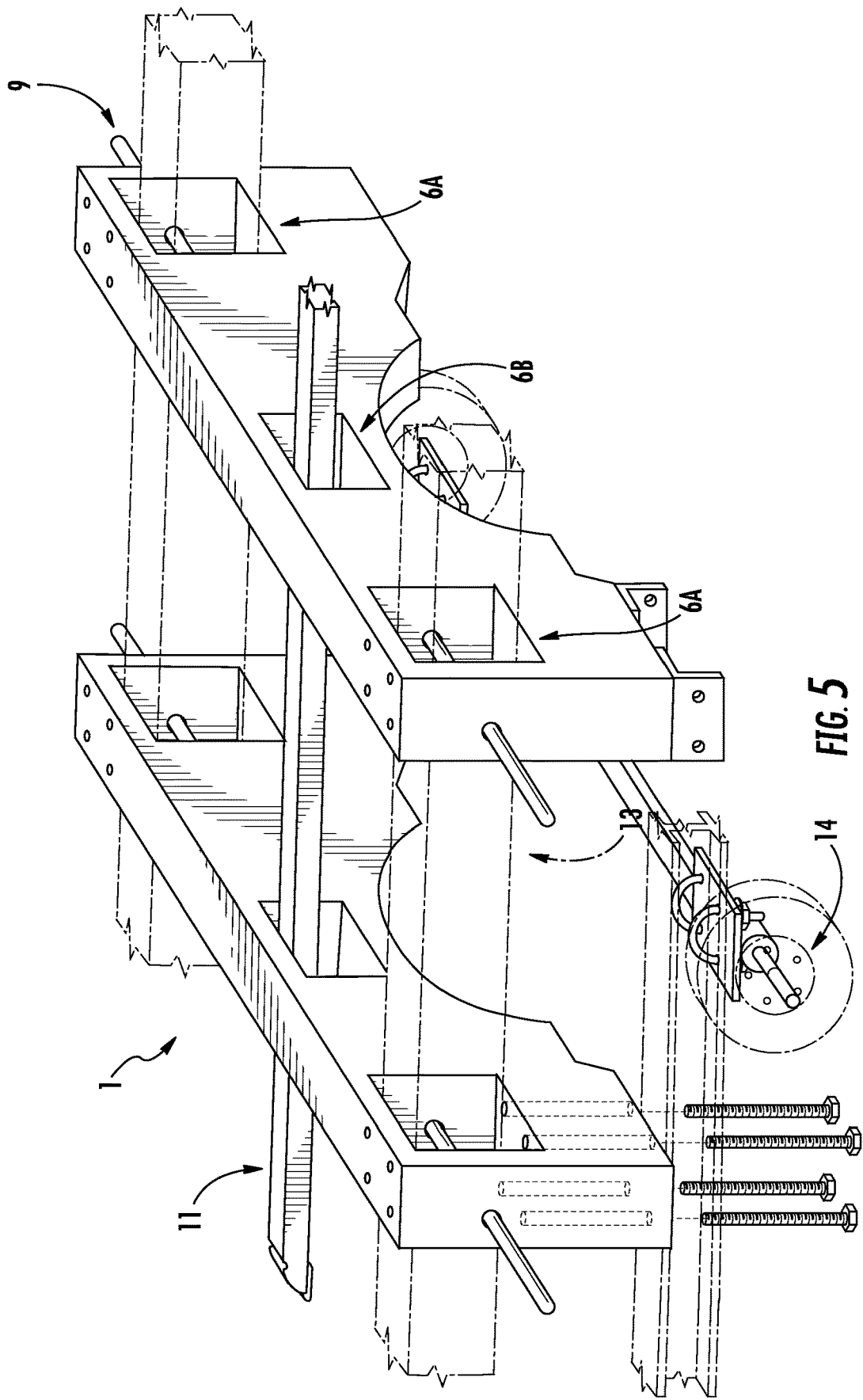
FIG. 5 presents a front isometric view of Structural Cross Frame Connector showing the bolting of a tow bar hitch in a configuration used in an embodiment taught herein.

FIG. 5 presents a front isometric view of Structural Cross Frame Connector showing the bolting of a tow bar hitch in a configuration used in an embodiment taught herein. In this utility trailer application, the arch at the central portion of the connector 1 is disposed at the bottom of the implementation. Thus, this embodiment teaches two or more inverted connectors 1 longitudinally parallel to each other; the upside down configuration provides excellent weight distribution since the arch at the central point of the device distributes weight efficiently.

Aluminum channel or I Beam 13 are inserted one each in pass through cavities 6A on either side of inverted connectors 1. Both aluminum channel or I Beam 13 have support holes perforating a lateral side thereof for insertion of the pass through rod 9. When placed in the connectors they are held in place by a pass through rod that threads through the holes 7, 7A, & 7B in connectors 1 pass through cavities 6A and middle pass through cavity 6B and through the holes in each aluminum channel or I Beam 13. Next, an aluminum channel or I beam is attached to each top surface 2 of the dual set of connectors; a torsion axle set 14 is attached to each aluminum channel or I beam using U bolts for each side of the axle along with nuts, washers and other connectors unique to the U bolt system being used. Similarly the rods 9 are connected to an external portion of connectors 1 using washers, nuts and similar fasteners.

Figure 6:
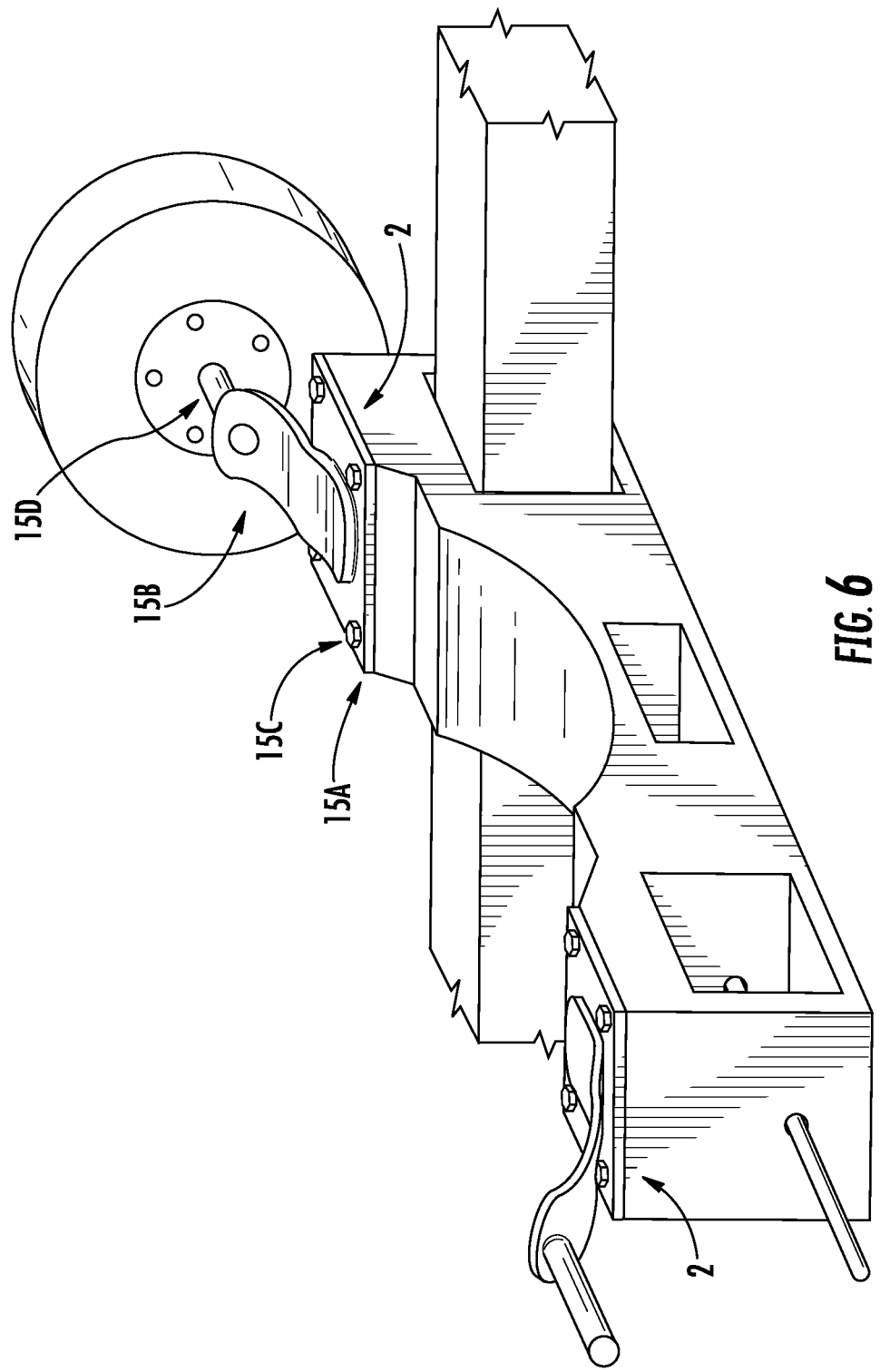
FIG. 6 presents a front isometric view of how a bolted torsion axle spindle is used along with the Structural Cross Frame Connector in an embodiment taught herein.

FIG. 6 presents a front isometric view of how torsion axles are used along with the Structural Cross Frame Connector in an embodiment taught herein. This diagram presents an independent suspension system for a torsion spindle. A right and left side torsion spindle 15D are attached to each side of the connector 1 at a right side top surface 2 and at a left side top surface 2. An independent spring 15B is integrated with the spindle and a mounting plate to effect appropriate suspension. This embodiment uses a square or rectangular metal mounting plate 15A having four holes appropriately spaced for mounting on the holes in the right and left top side surfaces 2. Studs or bolts 15C are attached therethrough and on into holes in the body of right and or left side top surfaces 2; they pass through holes into 6A and connect with connectors such as nuts, washers and similar fasteners.

Integrally attached to a top portion of the metal mounting plate 15A through welding, is a metal strip 15B having two ends that is attached at an end thereof to a suitable location on the mounting plate 15A. This metal curved strip 15B of material acts as a curved spring device. The curved strip 15B further has a spindle 15D at the free end thereof for rotation of the tire thereon. As before in other implementations an aluminum channel or I Beam 13 are inserted one each in pass through cavities 6A on either side of inverted connectors 1. Both aluminum channel or I Beam 13 have support holes perforating a lateral side thereof for insertion of the pass through rod 9. When placed in the connectors they are held in place by a pass through rod that threads through the holes 7, 7A, & 7B in connectors 1 pass through cavities 6A and middle pass through cavity 6B and through the holes in each aluminum channel or I Beam 13; the pass through rod is held in place with appropriate fasteners such as nuts and washers. Finally, either square tube (shown), or I-beam can be used.

Figure 7:
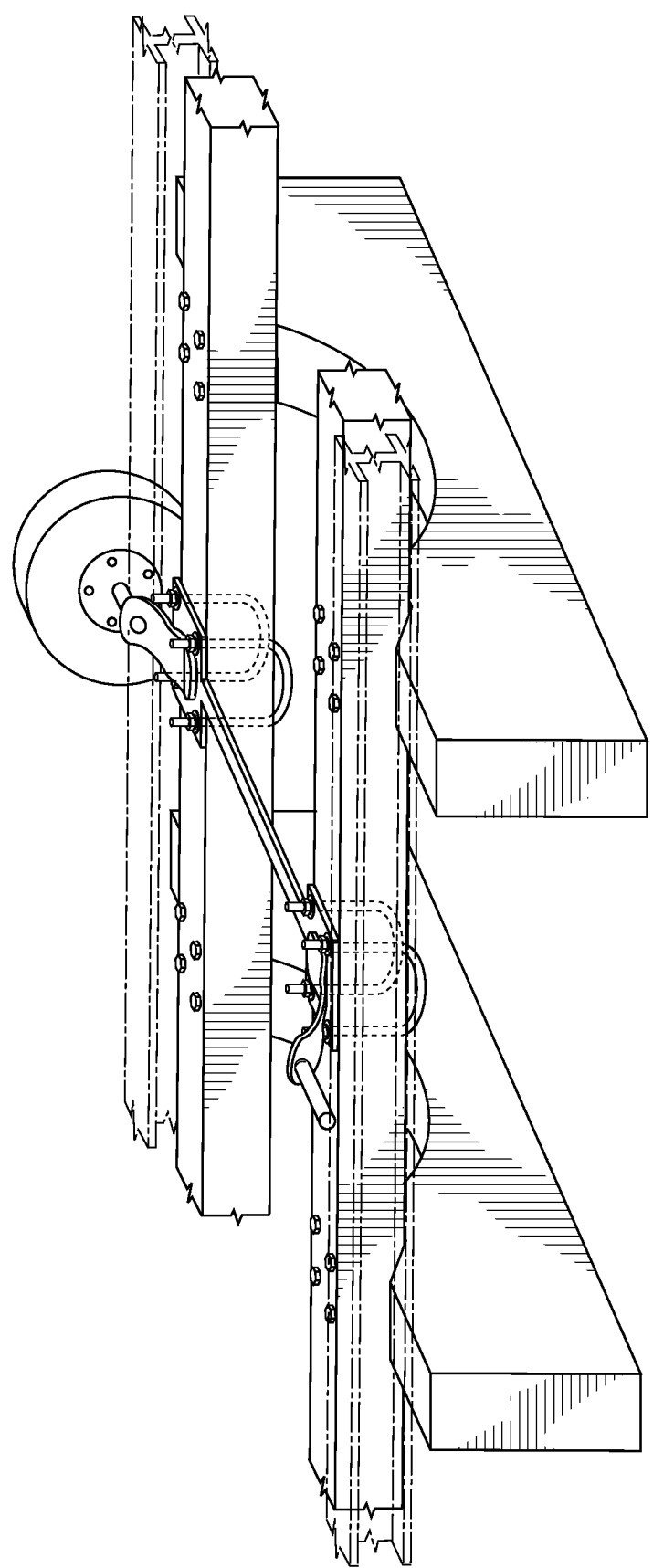
FIG. 7 presents a front isometric view of how a trailer frame is constructed using two frame members and a torsion axle in an embodiment taught herein.

FIG. 7 presents a front isometric view of how a trailer frame is constructed using several connectors 1 arranged in parallel longitudinally. First, there are a pair of I beam or aluminum channels 13 each mounted on one of the right and left horizontal rectangular portions 3. The I beams or aluminum channels 13 are mounted atop portions 3 using studs or bolts situated within holes in the I beams or aluminum channels 13 suitable for this purpose and on into holes in the portions 3. Nuts, washers and or other attachment fasteners finish the connection at the bottom portion of the connector 1 for securing the beams or channels 13 thereon.

Next, constructing a shorter width torsion axle to the aluminum channel or I beam 13. U bolts attach about the I beam or aluminum channel 13 and on into a mounting plate of the torsion axle having several holes therein for this purpose. Suitable bolts, stud, washers, nut or other fasteners finish the connection. A similar setup is found on the other side of the torsion axle where an identical mounting plate having holes for mounting of U bolt attachments to the I beam or aluminum channel 13.

Figure 8:
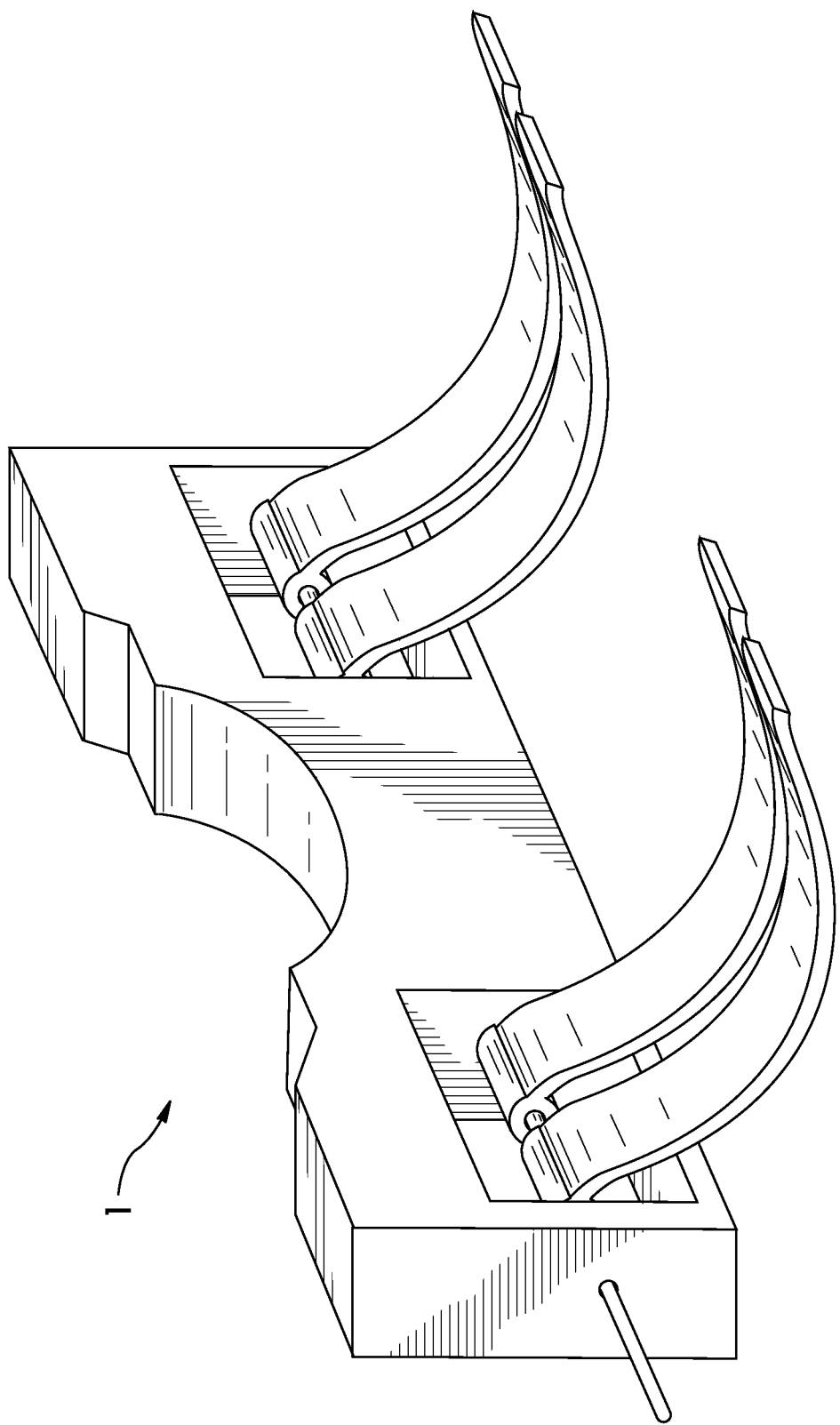
FIG. 8 presents a front isometric view of a dual leaf spring configuration using the Structural Cross Frame Connector in an embodiment taught herein.

FIG. 8 presents a front isometric view of how a utility or boat trailer frame is constructed using a tandem leaf spring within a Structural Cross Frame Connector in an embodiment taught herein. This permits the use of dual leaf springs 12 on either side of a larger pass through cavity 6A on either side of the connector 1. Of course it is understood that the connector 1 is disposed with its concave arch 4 disposed to the top of the drawing.

Figure 9A:
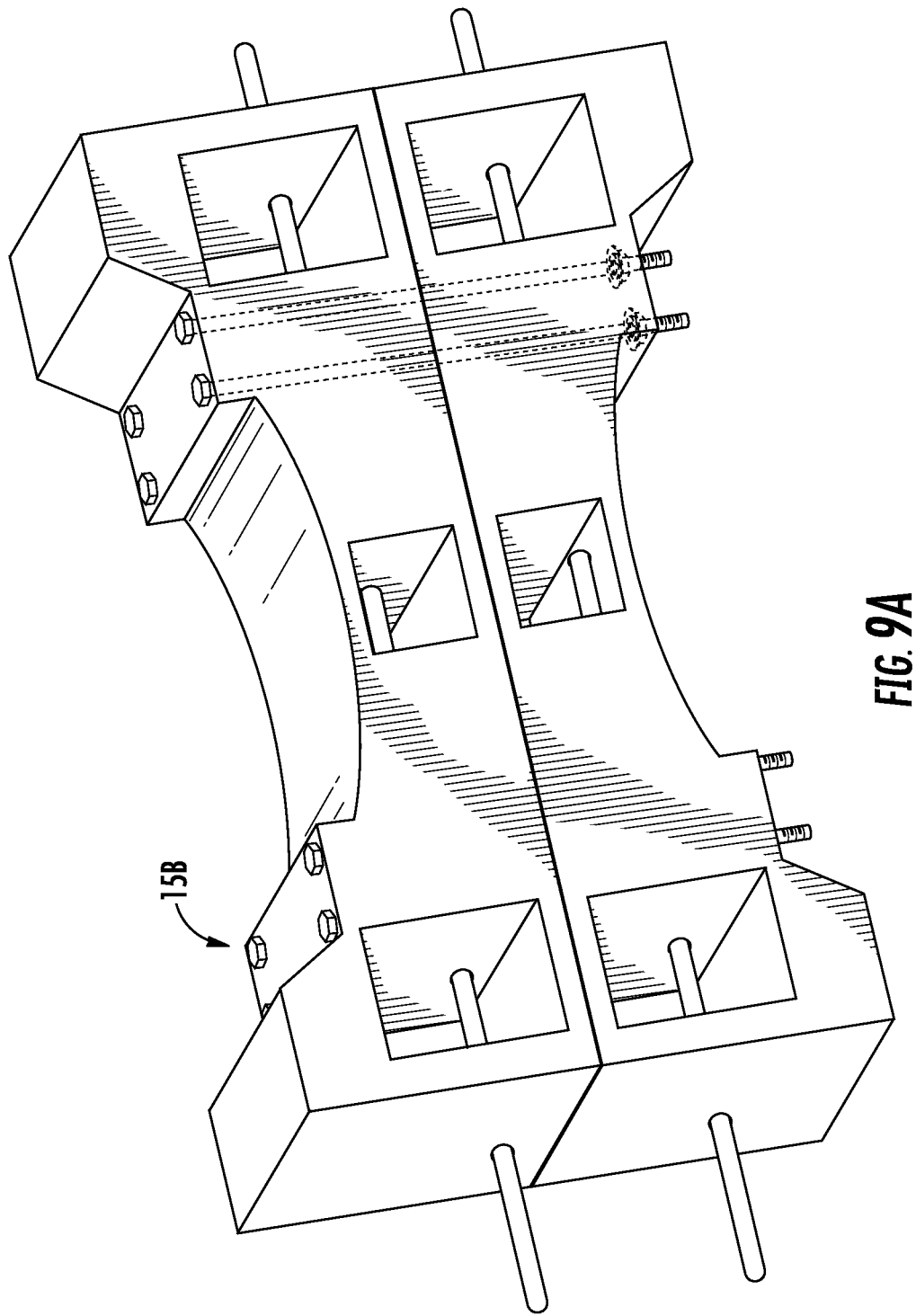
FIG. 9A represents a dual connector attachment system whereby the height of the connector system can be increased in an embodiment taught herein.

FIG. 9A represents a dual connector attachment system whereby the height of the connector system can be increased in an embodiment taught herein. In the dual system a first connector 1 has its bottom portion 6C attached to the physically adjacent bottom portion 6C of a corresponding second connector 1. A stud 15B is inserted within the holes of right and left rectangular portions 3 passing from the first connector 1 on into the second connector 1 whereupon it emerges at the top of the second corresponding connector 1. Appropriate attachment is made using washers, nuts or similar fasteners.

Figure 9B:
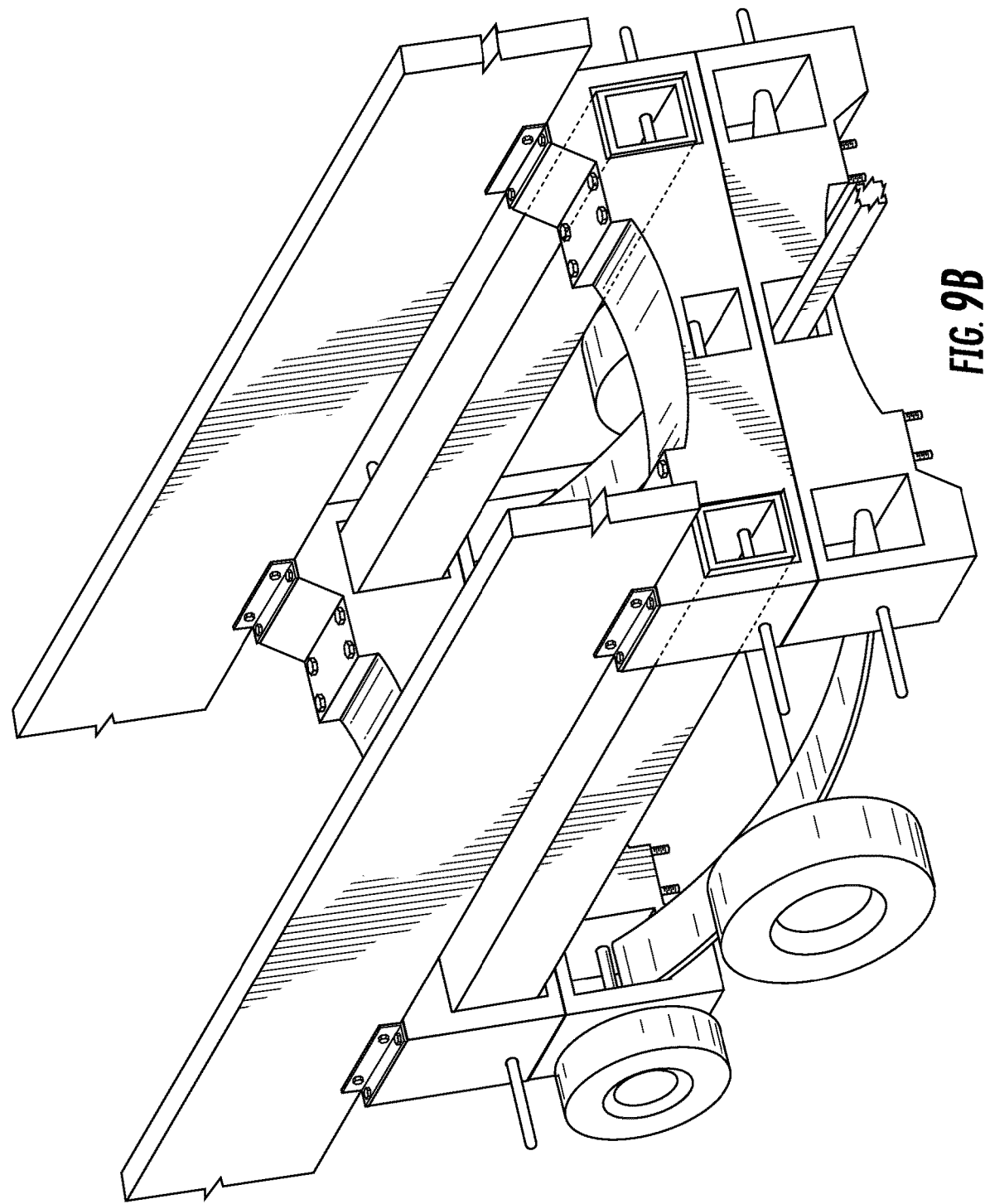
FIG. 9B teaches a dual connector assembly using two dual connector systems of FIG. 9A attached in parallel longitudinally such that each system has a top and bottom connector 1 as taught in an embodiment.

FIG. 9B teaches a dual connector assembly using two dual connector systems of FIG. 9A attached in parallel longitudinally such that each system has a top and bottom connector 1. The two top connectors of each dual connector systems each has two pieces of lumber connected there between L shaped 8, 8A connectors at the top sides 2 of each top connector 1. A leaf spring is disposed between the pass through cavity of a bottom connector 1 in one dual system and on into a passthrough cavity of a bottom connector 1 of the second dual connection system; the other leaf spring is disposed similarly in the other passthrough cavities 6A of the first and second bottom connectors 1. A central wheel is mounted on either side of a torsion axle attached to the spring on either side using U bolts.

In this implementation however, it should be understood that these leaf springs have a hole at an end thereof to grasp the pass through rod of one of the bottom connectors 1. The other end of the two leaf springs 12 floats free (typically in the rear bottom connector 1 shown having the wheel connected to a pass through rod in the drawing) within the pass through cavity of the dual connector system connector 1 opposite to the connector 1 in the first dual connector system having the leaf spring hole threaded in a pass through rod. Two middle wheels are attached to a torsion axle using U bolt attachments one to each leaf spring on either side of the vehicle thereof. Another set of two wheels is attached to a pass through rod of the bottom connector 1 in one or both of the two dual connector systems one on each side of each connector 1. Appropriate use of fasteners such as nuts, washers or similar fasteners to the rod 9 is understood.

Figure 10A:
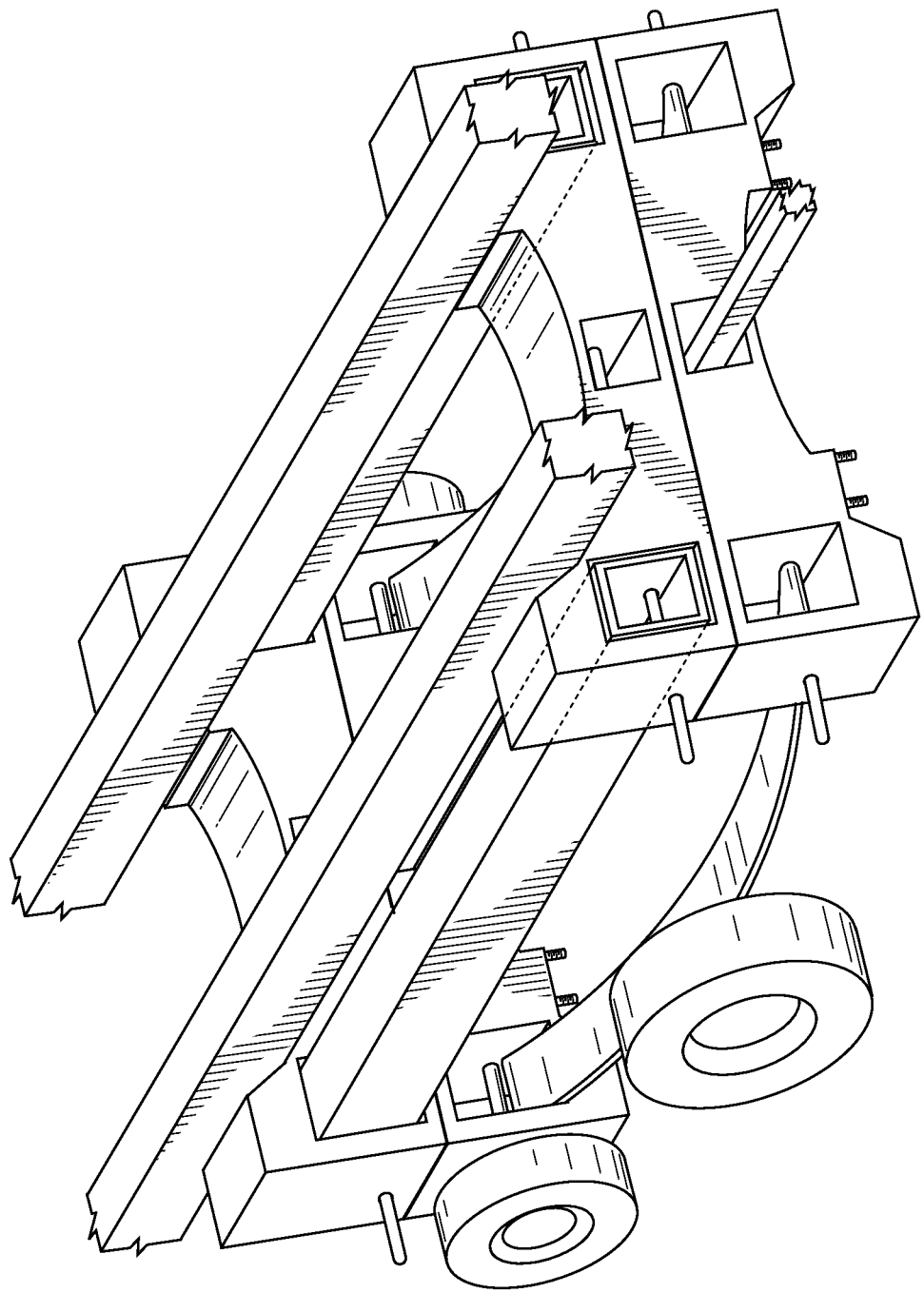
FIG. 10A presents another dual connector system assembly using the inner portion of the assembly for carrying items as taught in an embodiment.

FIG. 10A presents another dual connection assembly using the inner portion of the dual connection assembly for carrying items as taught in an embodiment. A hitch is attached using pass through rod between the center pass through cavity of both bottom connectors 1. Lumber is attached to the right and left horizontal portions using L 8, 8A above the top connectors 1 of each dual system. Hollow aluminum beams are attached using two corresponding right and two corresponding left pass through cavities 6A of the top connectors 1. It should be understood that these aluminum beams are attached to the pass through rods that have appropriate holes for this purpose. The attachment of the wheels is as in FIG. 9B with the torsion axle left out of the drawing for simplicity.

Figure 10B:
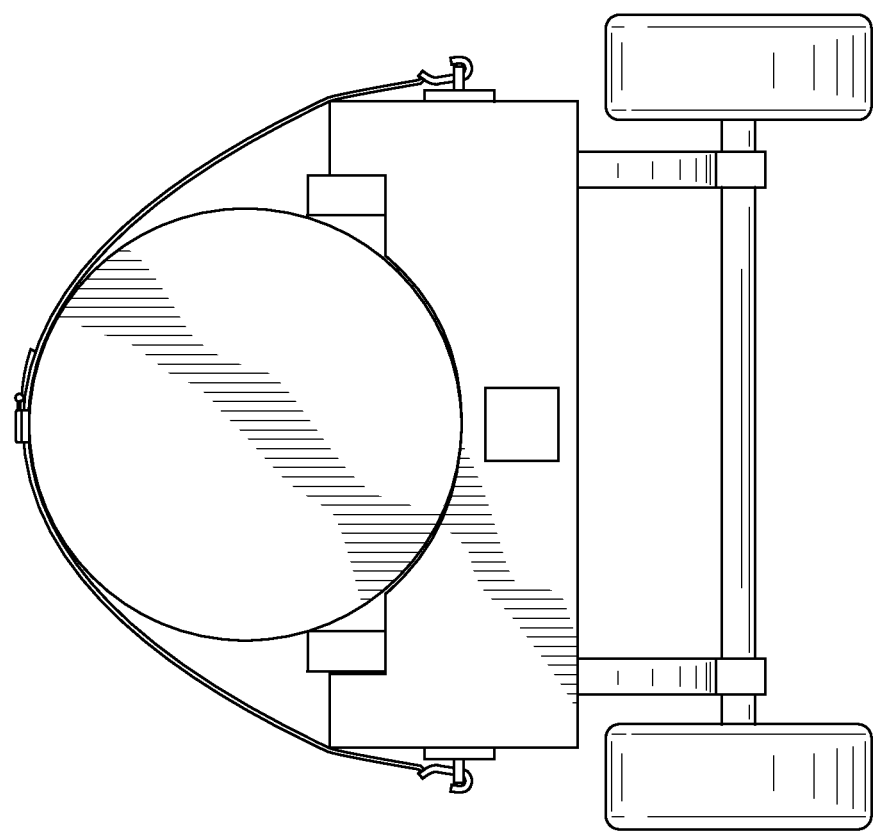
FIG. 10B presents a side view of a barrel carrying assembly made of connectors 1 as taught in an embodiment.
Figure 10C:
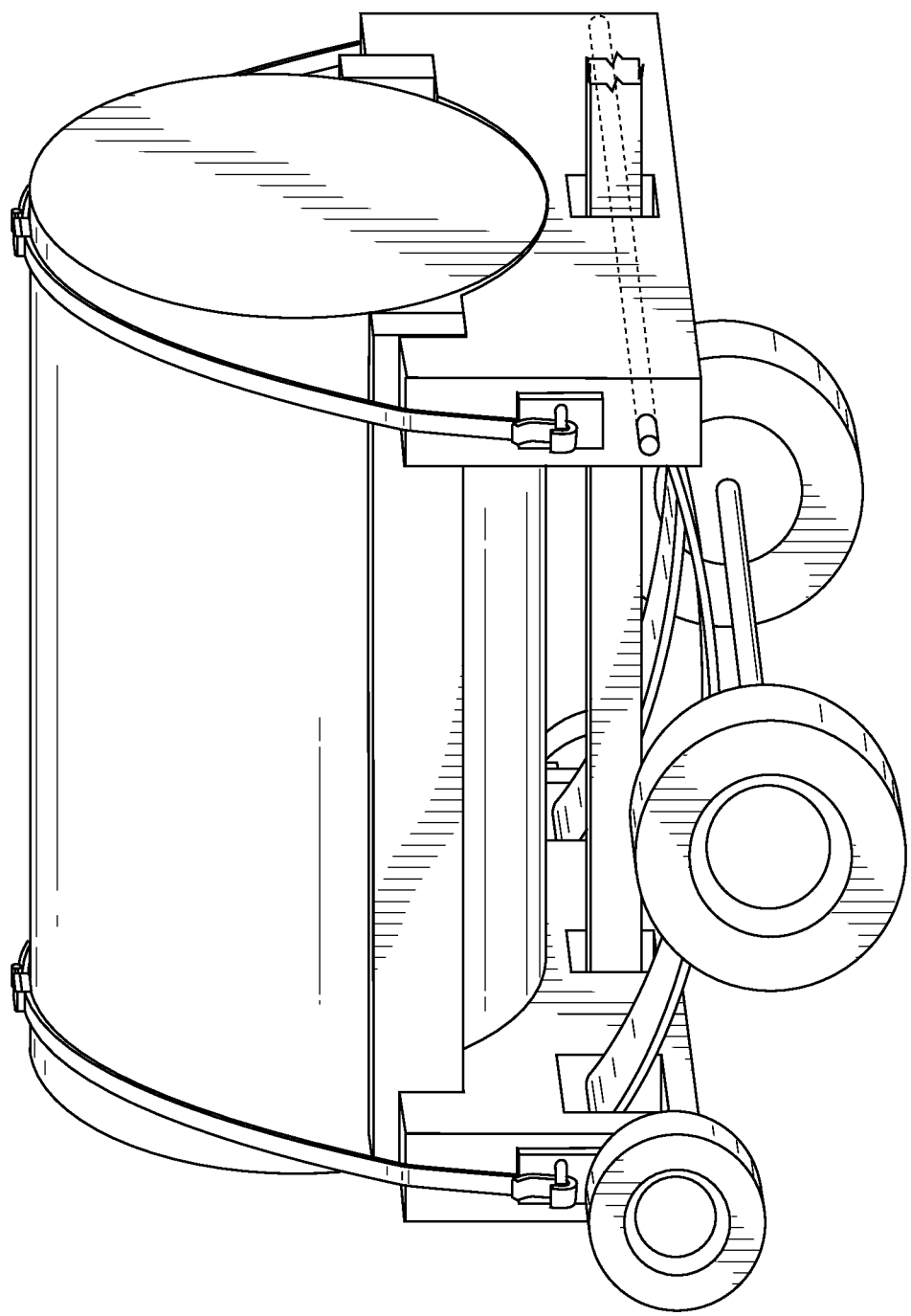
FIG. 10C presents a front isometric view of a barrel carrying assembly made of connectors 1 as taught in an embodiment.

FIG. 10B presents a side view of a barrel carrying assembly made of forward and rear connectors 1 as taught in an embodiment. FIG. 10C presents a front isometric view of a barrel carrying assembly made of connectors 1 as taught in an embodiment. Here a barrel sits in the curved central portion 4 of a forward and rear connector 1. A central hitching rod is attached within each of the central pass through cavities 6B. A first carabiner strap is attached at an end to a mounting point on the right vertical side 5 of a connector 1 by doubling over an end of the strap through the mounting (U point) and sewing it to itself locking that end to the mounting point; the mounting point is formed from similar fiberglass materials as the connector 1 and the U point is made from some resilient corrosive resistant material that is embedded into the fiberglass surface of the connector side (mounting point: square in the drawing).

Also, a second carabiner strap using another carabiner attached to the second strap by doubling over the strap and sewing it to itself through another carabiner end is similarly attached to a second mounting point and U point on the opposite side of the connector 1. Thus, the other end of the second carabiner strap is attached to another mounting point at the left vertical side 5. The inner portion as understood of the carabiner straps are attached to each other using another carabiner device attached by doubling the strap material through the respective carabiners and sewing it to themselves thereby attaching a carabiner to its respective strap end. A second set of dual carabiner straps is attached to the rear connector 1 forming holding devices for the retention of a barrel therein loaded in the central curved arch 4 of the connectors 1. It should also be understood that a pair of planks one to either side are optionally inserted on the right and left top portions between the forward and rear connectors 1 to stabilize the barrel depending on its size.

Figure 11:
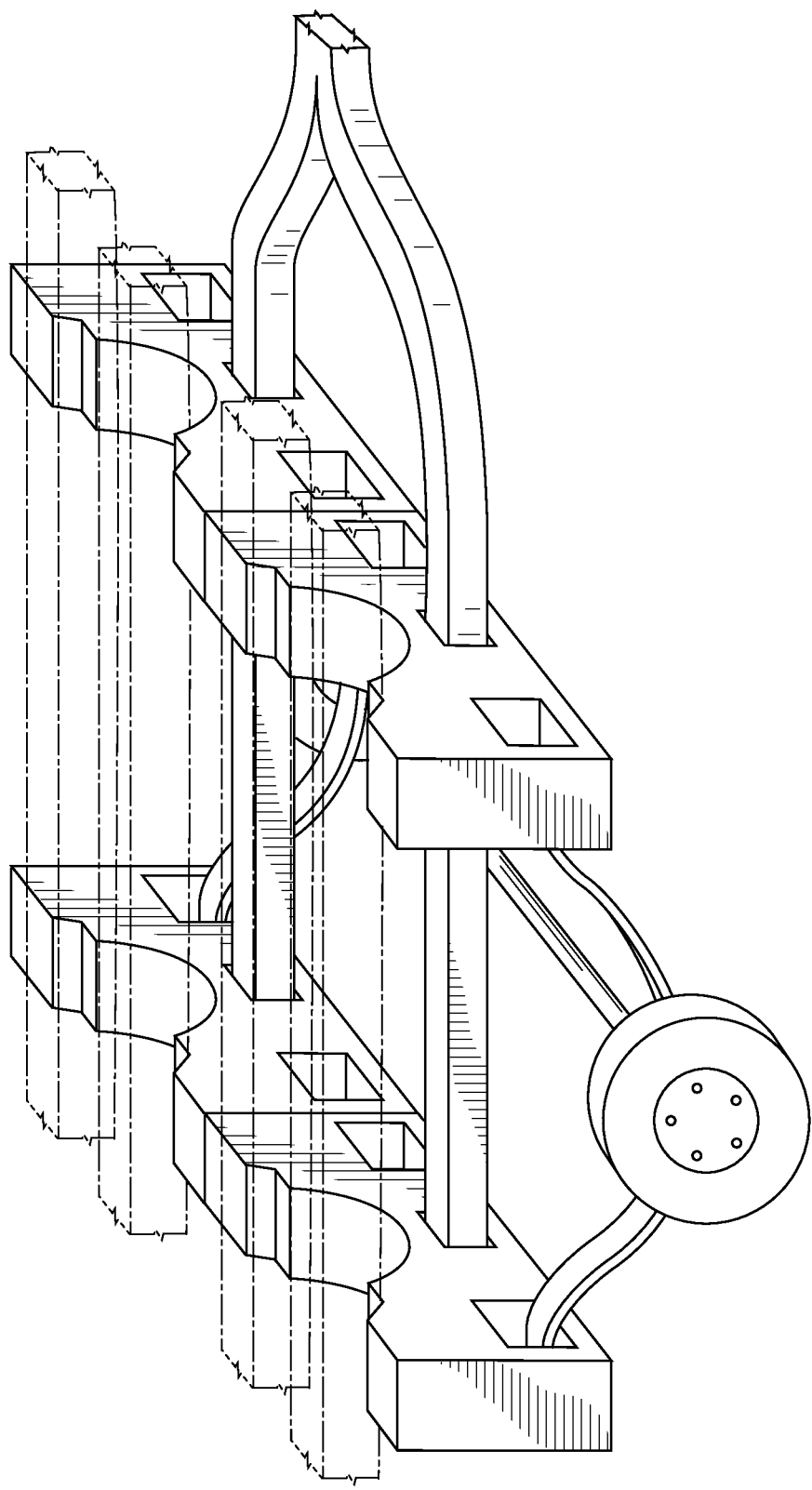
FIG. 11 presents a multiple horizontal connector assembly system as taught in an embodiment.

FIG. 11 presents a multiple horizontal connector assembly system as taught in an embodiment. Here a group of four connectors 1 making two sets of two connectors 1 are arranged sequentially as well as longitudinally such that the two sets are parallel to one another. A hitch member dividing into two branches forming a 'tuning fork' type appearance flow into each of the middle pass through cavities 6B and are attached thereto using pass through rods 9. Two leaf springs are each attached to a forward connector 1 and to a rear connector 1 at a corresponding pass through rod 9 on either side of the outermost connectors 1; that is the inner pass through cavity is not used for a leaf spring as you proceed from either external part of the system inwards towards the center, rather, only the outermost ones are used. It should be understood that a torsion member is attached to two centrally located wheels, one on either side of the torsion rod that is attached using U bolts to the leaf springs. Here it should be known that it has the option of using two tow bar connectors.

It should be appreciated that the particular use described in any embodiment is descriptive of the use and should not be viewed as limiting the implementation. For example, the statement that this is a jet ski, trailer, bunk, boat or oil drum or any other type of specific implementation should not be intended to limit the use of these particular structures to that specific implementation. Rather, the implementation use description is only a statement to assist in describing how the various components are put together. Thus, any embodiment herein described can be utilized for any of the uses herein described as a jetski, boat, trailer, bunk carrier etcetera.

Also, it should be readily apparent that appropriate connection of connectors 1, rod 9, wheels, I beams, hollow members, hitches and more are through the use of typical fasteners bolts, nuts, washers and similar fasteners through appropriate holes described in the various embodiments herein described. If a specific embodiment does not describe the hole it should be found in another similar embodiment and that for simplicity is assumed for the given embodiment. This general rule applies for the other features taught herein.

Another option permits the openings that hold the I-beam or square tube can be adjusted higher-to allow the trailer to lower/closer to the ground-in a boat use application. In other words, there are other perforations in I-beam or square tube for changing its height in the pass through cavities. Another alternative is that there are multiple holes 7, 7A, 7B for the pass through rod to pass through cavities.

The system and connectors 1 described herein has an internal hanger that no other trailer has; this internal hanger location in the mid pass through cavity 6B is a place for the tow bar hitch to be attached thereto. No other trailer has this feature. Additionally, the trailer has the tow bar hitch going the whole length of the trailer through all of the other components such as connectors 1 down the line.

Further, the above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A towable connector system comprising:
   an integral connector body formed as a single unit; the integral connector body having:
   a front surface having a first top edge, a second top edge, a first bottom edge, a first lateral edge and a second lateral edge;
   a back surface having a third top edge, a fourth top edge, a second bottom edge, a third lateral edge and a fourth lateral edge;
   a bottom portion sharing the first bottom edge with the front surface and sharing the second bottom edge with the back surface as well as having a first side edge and a second side edge;
   a first side having a fifth top edge, wherein the first side shares the first side edge with the bottom portion as well as sharing the first lateral edge with the front surface and sharing the third lateral edge with the back surface;
   a second side having a sixth top edge, wherein the second side shares the second side edge with the bottom portion as well as sharing the second lateral edge with the front surface and sharing the fourth lateral edge with the back surface; such that the front surface and the back surface are integrally formed together through the bottom portion and the first side and the second side at opposite ends of the connector body;
   a first top surface bordered by the first top edge, the third top edge and the fifth top edge; and
   a second top surface bordered by the second top edge, the fourth top edge and the sixth top edge; such that the first top surface and the second top surface are formed in a same plane and integrally formed together through
   an intermediate portion wherein the intermediate portion is vertically offset from both the first top surface and the second top surface;
   a first pass through cavity nearby the first top surface such that the first pass through cavity perforates the front and back surfaces;
   a second pass through cavity nearby the second top surface such that the second pass through cavity perforates the front and back surfaces;

a right portion integrally formed from the first top surface and integrally formed with a right horizontal rectangular portion;
a left portion integrally formed from the second top surface and integrally formed with a left horizontal rectangular portion;
a right step integrally formed with the right portion; and
a left step integrally formed with the left portion; such that the intermediate portion is integrally formed therewith and disposed between the right and the left step.

2. The towable connector system of claim 1, further comprising:
a middle pass through cavity underneath the intermediate portion such that the middle pass through cavity perforates the front and back surfaces.

3. The towable connector system of claim 1, wherein the intermediate portion further comprises:
an arch intermediate portion such that the arch intermediate portion is a concavity disposed such that
a central portion thereof is deeper than any other location in the arch intermediate portion and thereby closer to the bottom portion.

4. A towable connector system comprising:
an integral connector body formed as a single unit; the integral connector body having:
a front surface having a first top edge, a second top edge, a first bottom edge, a first lateral edge and a second lateral edge;
a back surface having a third top edge, a fourth top edge, a second bottom edge, a third lateral edge and a fourth lateral edge;
a bottom portion sharing the first bottom edge with the front surface and sharing the second bottom edge with the back surface as well as having a first side edge and a second side edge;
a first side having a fifth top edge, wherein the first side shares the first side edge with the bottom portion as well as sharing the first lateral edge with the front surface and sharing the third lateral edge with the back surface;
a second side having a sixth top edge, wherein the second side shares the second side edge with the bottom portion as well as sharing the second lateral edge with the front surface and sharing the fourth lateral edge with the back surface; such that the front surface and the back surface are integrally formed together through the first side and the second side at opposite ends of the connector body; and the front surface and the back surface are also integrally formed together through the bottom portion, the first side, and the second side;
a first top surface bordered by the first top edge, the third top edge and the fifth top edge; and
a second top surface bordered by the second top edge, the fourth top edge and the sixth top edge; such that
the first top surface and the second top surface are formed in a same plane and integrally formed together through
an intermediate portion wherein the intermediate portion is vertically offset from both the first top surface and the second top surface;
a first pass through cavity nearby the first top surface such that the first pass through cavity perforates the front and back surfaces;
a second pass through cavity nearby the second top surface such that the second pass through cavity perforates the front and back surfaces;

and wherein the towable connector system further comprises:
a first top portion integrally formed from the first top surface through a first transition surface there between;
a second top portion integrally formed from the second top surface through a second transition surface there between; and wherein the intermediate portion further comprises:
an arch disposed between the first top portion and the second top portion.

5. A towable connector system comprising:
an integral connector body formed as a single unit; the integral connector body having:
a front surface having a first top edge, a second top edge, a first bottom edge, a first lateral edge and a second lateral edge;
a back surface having a third top edge, a fourth top edge, a second bottom edge, a third lateral edge and a fourth lateral edge;
a bottom portion sharing the first bottom edge with the front surface and sharing the second bottom edge with the back surface as well as having a first side edge and a second side edge;
a first side having a fifth top edge, wherein the first side shares the first side edge with the bottom portion as well as sharing the first lateral edge with the front surface and sharing the third lateral edge with the back surface;
a second side having a sixth top edge, wherein the second side shares the second side edge with the bottom portion as well as sharing the second lateral edge with the front surface and sharing the fourth lateral edge with the back surface; such that the front surface and the back surface are integrally formed together through the first side and the second side at opposite ends of the connector body; and the front surface and the back surface are also integrally formed together through the bottom portion, the first side, and the second side;
a first top surface bordered by the first top edge, the third top edge and the fifth top edge; and
a second top surface bordered by the second top edge, the fourth top edge and the sixth top edge; such that
the first top surface and the second top surface are formed in a same plane and integrally formed together through
an intermediate portion wherein the intermediate portion is vertically offset from both the first top surface and the second top surface;
a first pass through cavity nearby the first top surface such that the first pass through cavity perforates the front and back surfaces;
a second pass through cavity nearby the second top surface such that the second pass through cavity perforates the front and back surfaces;
a first top portion parallel to and integrally formed with the first top surface; wherein the first top portion is also integrally formed with the intermediate portion and vertically offset from both the first top surface and the intermediate portion such that the first top portion is closer to the bottom portion than the first top surface is.

6. The towable connector system of claim 5, further comprising:
a second top portion parallel to and integrally formed with the second top surface; wherein the second top portion is also integrally formed with the intermediate portion and vertically offset from both the second top surface and the intermediate portion such that the second top portion is closer to the bottom portion than the second top surface is.

7. A towable connector system comprising:
an integral connector body formed as a single unit; the integral connector body having:
  a front surface having a first top edge, a second top edge, a first bottom edge, a first lateral edge and a second lateral edge;
  a back surface having a third top edge, a fourth top edge, a second bottom edge, a third lateral edge and a fourth lateral edge;
  a bottom portion sharing the first bottom edge with the front surface and sharing the second bottom edge with the back surface as well as having a first side edge and a second side edge;
  a first side having a fifth top edge, wherein the first side shares the first side edge with the bottom portion as well as sharing the first lateral edge with the front surface and sharing the third lateral edge with the back surface;
  a second side having a sixth top edge, wherein the second side shares the second side edge with the bottom portion as well as sharing the second lateral edge with the front surface and sharing the fourth lateral edge with the back surface; such that the front surface and the back surface are integrally formed together through the first side and the second side at opposite ends of the connector body; and the front surface and the back surface are also integrally formed together through the bottom portion, the first side, and the second side;
  a first top surface bordered by the first top edge, the third top edge and the fifth top edge; and
  a second top surface bordered by the second top edge, the fourth top edge and the sixth top edge; such that the first top surface and the second top surface are formed in a same plane and integrally formed together through
    an intermediate portion wherein the intermediate portion is vertically offset from both the first top surface and the second top surface;
a first pass through cavity nearby the first top surface such that the first pass through cavity perforates the front and back surfaces;
a second pass through cavity nearby the second top surface such that the second pass through cavity perforates the front and back surfaces;
a first pass through hole in the first side such that the first pass through hole exits within the first pass through cavity.

8. The towable connector system of claim 7, further comprising:
a second pass through hole in the second side such that the second pass through hole exits within the second pass through cavity.

9. The towable connector system of claim 8, further comprising:
a third pass through hole perforating a first side wall of the first pass through cavity and perforating a second side wall of a middle pass through cavity; wherein the middle pass through cavity is disposed underneath the intermediate portion such that the middle pass through cavity perforates the front and back surfaces.

10. The towable connector system of claim 4, wherein the arch disposed between the first top portion and the second top portion further comprises:
a step down arch integrally formed from the first top portion at a third transition surface there between, and wherein the step down arch is integrally formed from the second top portion at a fourth transition surface there between;
wherein the step down arch is disposed closer to the bottom portion than the first or second top portions.

11. The towable connector system of claim 5, wherein the intermediate portion further comprises:
an arch intermediate portion wherein the top surface and the top portion are integrally formed together through an integrally formed transition surface such that the arch intermediate portion is integrally formed from the top portion therewith.

12. The towable connector system of claim 11, wherein the arch intermediate portion further comprises:
a concavity disposed such that
  a central portion thereof is deeper than any other location on the arch intermediate portion and thereby closer to the bottom portion than the first top surface or the first top portion are.

13. The towable connector system of claim 5, further comprising:
a first step down offset portion such that the first step down offset portion is integral with the first top portion and the intermediate portion wherein the intermediate portion is situated closer to the bottom portion than the first top portion or the first top surface are.

14. The towable connector system of claim 13, further comprising:
a second step down offset portion such that the second offset portion is integral with a second top portion and the intermediate portion wherein the intermediate portion is situated closer to the bottom portion than the second top portion or the second top surface are; wherein the second top portion is parallel to and integrally formed with the second top surface; wherein the second top portion is also integrally formed with the intermediate portion and vertically offset from both the second top surface and the intermediate portion.

15. The towable connector system of claim 9, further comprising:
a fourth pass through hole perforating a third side wall of the middle pass through cavity and perforating a fourth side wall of the second pass through cavity; such that
a pass through rod inserted within the first, second, third and fourth holes is attached to the connector body externally thereto in association with the first side and second side.

16. A towable connector system comprising:
an integral connector body formed as a single unit; the integral connector body having:
  a front surface having a first top edge, a second top edge, a first bottom edge, a first lateral edge and a second lateral edge;
  a back surface having a third top edge, a fourth top edge, a second bottom edge, a third lateral edge and a fourth lateral edge;
  a bottom portion sharing the first bottom edge with the front surface and sharing the second bottom edge with the back surface as well as having a first side edge and a second side edge;
  a first side having a fifth top edge, wherein the first side shares the first side edge with the bottom portion as well as sharing the first lateral edge with the front surface and sharing the third lateral edge with the back surface;

a second side having a sixth top edge, wherein the second side shares the second side edge with the bottom portion as well as sharing the second lateral edge with the front surface and sharing the fourth lateral edge with the back surface; such that the front surface and the back surface are integrally formed together through the bottom portion and the first side and the second side at opposite ends of the connector body;

a first top surface bordered by the first top edge, the third top edge and the fifth top edge; and a second top surface bordered by the second top edge, the fourth top edge and the sixth top edge; such that the first top surface and the second top surface are formed in a same plane and integrally formed together through an intermediate portion wherein the intermediate portion is vertically offset from both the first top surface and the second top surface;

a first pass through cavity nearby the first top surface such that the first pass through cavity perforates the front and back surfaces;

a second pass through cavity nearby the second top surface such that the second pass through cavity perforates the front and back surfaces;

a middle pass through cavity underneath the intermediate portion such that the middle pass through cavity perforates the front and back surfaces a hitching device attached to the middle pass through cavity using fasteners.

17. A The unitary connector body comprising:
a front surface;
a back surface;
a bottom surface;
a first side;
a second side;
a first top surface;
a second top surface; such that
the first top surface is integrally formed with the first side, and the second top surface is integrally formed with the second side, and wherein the first top surface and the second top surfaces are each integrally formed with the front and back surfaces and the first top surface and the second top surface are integrally formed together through:

an intermediate portion wherein the intermediate portion is vertically offset from both the first top surface and the second top surface;

a first pass through cavity nearby the first top surface such that the first pass through cavity perforates the front and back surfaces;

a second pass through cavity nearby the second top surface such that the second pass through cavity perforates the front and back surfaces;

wherein the front surface and the back surface are integrally formed together through the first side integrating the front, back and bottom surfaces and the second side integrating the front, back and bottom surfaces at opposite ends of the connector body; and wherein the front surface and the back surface are also integrally formed together through the bottom surface such that the unitary connector body further comprises:

a first top portion integrally formed from the first top surface at a first transition surface there between;

a second top portion integrally formed from the second top surface at a second transition surface there between; and wherein the intermediate portion further comprises:

an arch disposed between the first top portion and the second top portion; and such that the arch further comprises:

a step down arch integrally formed from the first top portion at a step down third transition surface there between; and wherein the step down arch is integrally formed from the second top portion at a step down fourth transition surface there between;

wherein the step down arch is disposed closer to the bottom portion than the first or second top portions.

18. The unitary connector body of claim 17, wherein the unitary connector body is formed of fibrous material.

19. The towable connector system of claim 1, wherein the integral connector body is formed of fibrous material.

20. The towable connector system of claim 4, wherein the integral connector body is formed of fibrous material.

21. The towable connector system of claim 5, wherein the integral connector body is formed of fibrous material.

22. The towable connector system of claim 7, wherein the integral connector body is formed of fibrous material.

23. The towable connector system of claim 16, wherein the integral connector body is formed of fibrous material.

* * * * *